United States Patent [19]

Nikolaus et al.

[11] Patent Number: 5,107,722
[45] Date of Patent: Apr. 28, 1992

[54] ARRANGEMENT AND METHOD FOR OPERATING A VARIABLE DRIVE UNIT

[75] Inventors: Heinrich W. Nikolaus, Hamburg; Abdul Arain, Kellberg; Robert Paton, Passau, all of Fed. Rep. of Germany

[73] Assignee: Zahnradfabrik Friedrichshafen AG, Friedrichshafen, Fed. Rep. of Germany

[21] Appl. No.: 654,618
[22] PCT Filed: Aug. 12, 1989
[86] PCT No.: PCT/EP89/00958
   § 371 Date: Feb. 13, 1991
   § 102(e) Date: Feb. 13, 1991
[87] PCT Pub. No.: WO90/02060
   PCT Pub. Date: Mar. 8, 1990

[30] Foreign Application Priority Data

Aug. 17, 1988 [DE] Fed. Rep. of Germany ....... 3827859

[51] Int. Cl.⁵ .............................................. F16H 61/42
[52] U.S. Cl. .................................... 74/866; 364/424.1
[58] Field of Search ........................ 74/866; 364/424.1

[56] References Cited

U.S. PATENT DOCUMENTS

| 4,220,059 | 9/1980 | Mizuno et al. | 364/424.1 X |
| 4,464,952 | 8/1984 | Stubbs | 74/866 X |
| 4,531,431 | 7/1985 | Dreher et al. | 74/866 |
| 4,594,666 | 6/1986 | Cornell | 364/424.1 |
| 4,648,040 | 3/1987 | Cornell et al. | 364/424.1 |
| 4,649,485 | 3/1987 | Osanai et al. | 364/424.1 |
| 4,776,233 | 10/1988 | Kita et al. | 74/866 X |
| 4,967,610 | 11/1990 | Sasajima et al. | 74/866 |

FOREIGN PATENT DOCUMENTS 0195452 11/1988 European Pat. Off. .
2143154  2/1973 France .

Primary Examiner—Dirk Wright
Attorney, Agent, or Firm—Herbert Dubno

[57] ABSTRACT

Arrangement and method for operating a drive unit for motor vehicles, particularly for agricultural and construction machinery, with a controllable internal combustion engine (2), a continuously variable hydromechanical power split transmission (6) and a control device (3) which in order to start and to operate the vehicle at low speeds and under load, at first reduces the rotational speed of the internal combustion engine to less then the nominal speed, reaches a first speed by reducing the delivery volume of the adjusting pump (13) of the hydrostatic branch (15), a further increased speed by increasing the rotational speed of the internal combustion engine and as a result the further increase in the vehicle speed by controlling the transmission ratio of the hydrostatic-mechanical power split transmission (6) is achieved.

4 Claims, 2 Drawing Sheets

ARRANGEMENT AND METHOD FOR OPERATING A VARIABLE DRIVE UNIT

The invention relates to an arrangement and a method of operating a variable drive unit for a motor vehicle, particularly for agricultural and construction machinery., with a controllable internal combustion engine and a hydrostatic-mechanical power split transmission with continuously variable transmission ratio according to the introductory part of claim 1.

From the patent specification (DE 35 12 523) a continuously variable power split compound load-shifting transmission with group shifting is known. The transmission consists of two gear subgroups. One of them is a continuously variable power split linkage with several shafts. The other gear subgroup is a gear-shift mechanism with one speed group and several auxiliary gears which act upon the main driven shaft. The two linkage shafts alternately actuate the gear-shift mechanism. The gear shifts occur free of load at synchronous rotational speeds and without interruptions of traction power. The transmission works like a continuous transmission with a large range of controller output and makes possible to operate the internal combustion engine of a vehicle along a characteristic curve for minimal fuel consumption, this way achieving fuel economy.

From the laid open FR-A 21 43 154 a continuously variable hydromechanical load-shifting transmission is known, which can be adjusted in such a manner that in all operational states the driving internal combustion engine is operated in its best performance range. In order to avoid skidding of the vehicle tiers when the engine develops its full power, in the transmission for instance a pressure-control valve is provided in the hydrostatic transmission branch, in order to limit the transmittable maximum torque. This hydromechanical load-shifting transmission is purely hydrostatically operated for the start and reverse drive.

Drive units with hydrostatic-mechanical power split transmissions for motor vehicles usually register very high losses under certain operational conditions of the vehicle, e.g. at start or while traveling with very low speeds under high load. When the vehicle is standing and shifted into the first speed range, the primary unit built like an adjusting pump reaches its maximum delivery volume already in idling at the nominal speed of the internal combustion engine, whereby high hydrostatic idling losses result. With increasing load at the start, the delivery volume of the adjusting pump decreases, however, due to the load-dependent pressure increase, the hydraulic losses remain considerable, so that in this operational range the general efficiency remains low. Further, the large delivery volumes of the adjusting pump at high pressures in correlation with the high rotational speeds transmitted to the hydrostat by an internal combustion engine at nominal speeds leads to premature wear and to high noise emissions of the transmission.

For motor vehicles which start frequently from stillstand and/or permanently operate under conditions of very low speeds and high loads, such as agricultural and construction equipment, the operation of hydrostatic-mechanical power split transmissions is particularly problematic.

It is the object of the invention to improve on an arrangement and a method for operating a variable drive unit with a controllable internal combustion engine and a hydrostatic-mechanical power split transmission so that the motor vehicles which have to start frequently and/or travel at very low speeds under high load, can be operated with increased efficiency of the transmission and with reduced wear, reduced noise emission and lower speed (rpm) of the internal combustion engine.

The problem is solved according to the invention in that a common control device for the internal combustion engine and the power split transmission is provided, device which in a first phase of a starting operation under full load sets the speed $n_{mot}$ of the internal combustion engine to a lower value than the nominal rotational speed, resets the adjusting pump to a maximal delivery volume and engages the clutch for the first speed range of the power split transmission, in that during a second phase of the starting process, the delivery volume of the adjusting pump is reduced by the control device at a lowered rotational speed $n_{mot}$ until the hydromotor stops, in that in a third phase of the starting operation the vehicle speed with the hydromotor at a stillstand is increased by raising the rotational speed $n_{mot}$ to the nominal speed and that subsequently the speed increases up to the target speed solely due to the change of the delivery volume of the adjusting pump, respectively the gear-range shifting of the clutches.

This arrangement and this method for operating a continuously variable drive unit with a controllable internal combustion engine and a hydrostatic-mechanical power split transmission for a motor vehicle has the advantages that the power of the internal combustion engine is better attuned to the transmission ratio of the power split transmission at the start point and at very low speeds under high load, so that the traction of the motor vehicle is optimally exploited, the power flow in the hydrostatic transmission branch is diminished and the general efficiency of the power split transmission is improved. The construction of the power split transmission is not changed as a result of this improvement.

Theoretically, hydrostatic-mechanical power split transmissions have an infinite transmission ratio and offer correspondingly high torques at the drive axles at the start and at low speeds. However, the traction of a motor vehicle can transmit only a limited torque at start or at low speeds. The available torque of the internal combustion engine at the input of the hydrostatic-mechanical power split transmission can therefore be reduced, without creating disadvantages at the start or at low vehicle speeds. In addition, due to the invention, the strain and the wear of the internal combustion engine can be reduced.

According to claim 2, the control device can advantageously limit the speed of the internal combustion engine to maximum one half of the nominal speed. Of course, thereby it has to be avoided that it falls below the idling speed of the internal combustion engine.

The invention is not limited to the combination of the features in the claims. For the person skilled in the art, further combinations are possible without further ado within the framework of the invention.

Figure 1:
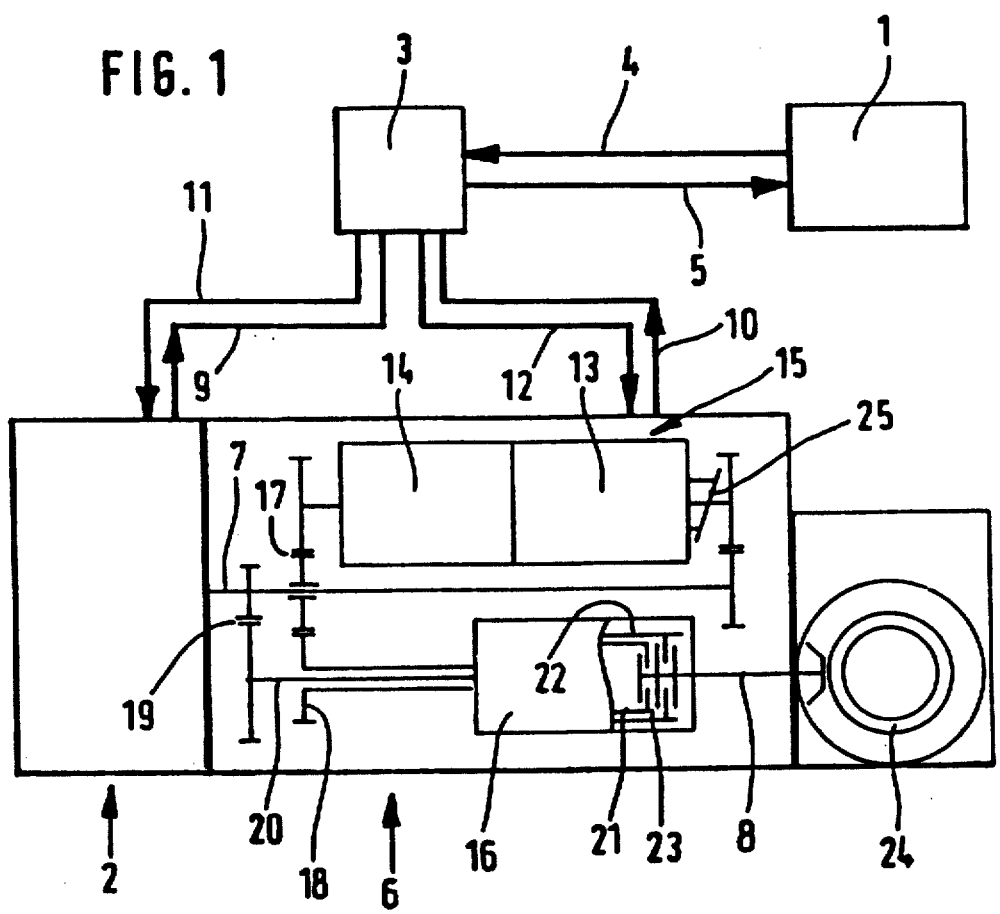
FIG. 1 shows the arrangement according to the invention

FIG. 1: At a selector switch 1 a freely selectable speed is set. At the selector switch 1, it is possible to select an economy-program for the operation of the internal combustion engine 2 at low consumption values and a full-load program for operating the internal combustion engine 2 at nominal (rated) speed. A control device 3 exchanges electrical signals, e.g. command signals and feedback, with the selector switch 1, via lines 4, 5. A variable drive unit consists of a controllable internal combustion engine 2 of the usual construction, which drives a hydrostatic-mechanical power split transmission 6. Between the internal combustion engine 2 and the power split transmission 6, there is no shiftable clutch. The control device 3 of known construction type, for instance an electronic control device, automatically controls the speed of the internal combustion engine 2 and the transmission ratio of the continuously variable hydrostatic-mechanical power split transmission 6, so that the preselected speed is initiated. For this purpose, measured value sensors which are not shown in the drawing are provided on a rotational-speed dependent driven input shaft 7 and on a transmission output shaft 8, which transmit the rotational speeds of the shafts to the control device 3 over lines 9, 10. The control device 3 compares the measured rpm values with the command signals from selector switch 1. Depending on the drive program stored in the control device 3, control signals are sent from the control device 3 over lines 11, 12 to the internal combustion engine 2 and the power split transmission 6.

The control of the internal combustion engine 2 takes place in the usual manner by throttling the air-suction cross section or by adjusting the fuel injection.

The transmission ratio of the hydrostatic-mechanical power split transmission can be continuously varied, by continuously adjusting the delivery volume of a primary unit 13 and thereby the rotational speed of a secondary unit 14— built as a hydromotor— of the hydrostatic branch 15 of the transmission 6. The primary unit 13 in the hydrostatic transmission branch 15, which is designed like an adjusting pump, is directly driven by the controllable internal combustion engine 2 via a drive shaft 7, and rotates with a rotational speed proportional to the speed of the internal combustion engine 2. The continuous transmission range in the hydrostatic transmission branch 15 in the power split transmission 6 is multiplied in the mechanical branch 16 by gear elements, e.g. planetary gears.

Over a reduction gear 19 and a shaft 20, the internal combustion engine 2 drives the mechanical transmission branch 16, which comprises at least one linkage gear (not shown). Linkage shafts 21, 22 of the linkage gear are driven with continuously variable rotational speeds, which result from the summation of the continuously variable rotational speeds of the hydromotor 14 and the constant rotational speed of the shaft 20.

The clutches 23 alternately connect one of the shafts 21 or 22 with the transmission output shaft 8, which drives the rear axle 24.

DESCRIPTION OF OPERATION

Figure 2:
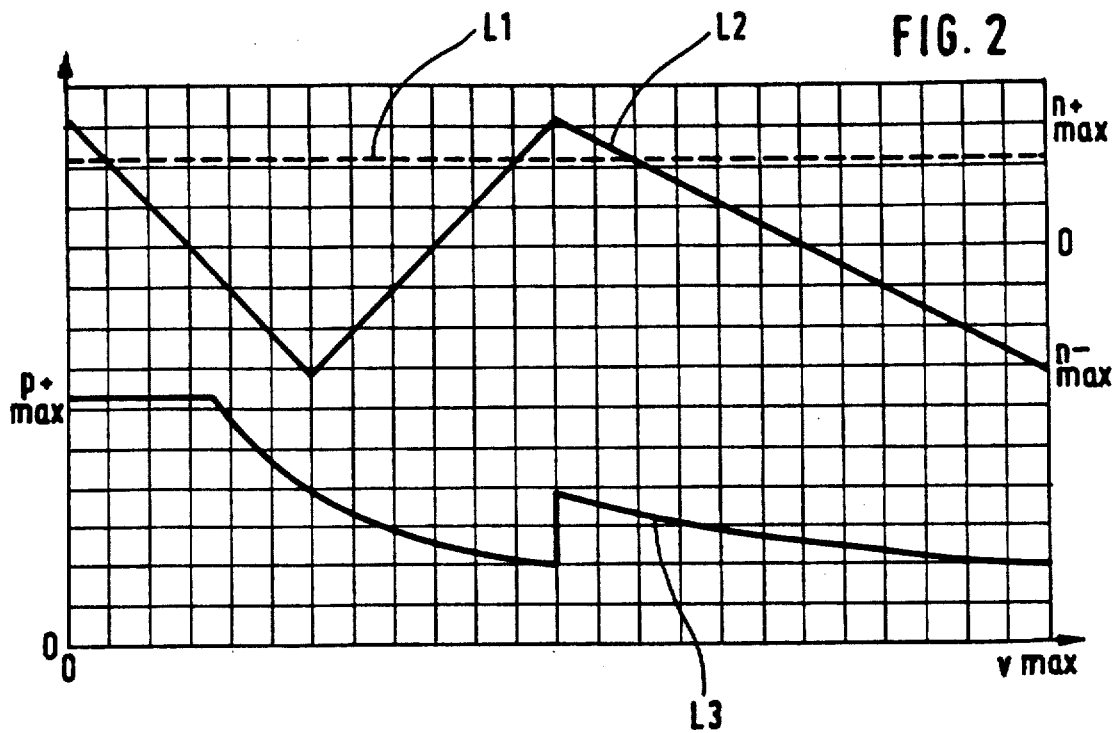
FIG. 2 shows in a diagram the rotational speed ratios and the pressure curve of a continuously variable drive unit, consisting of a controllable internal combustion engine and a hydrostatic-mechanical power split transmission according to the state of the art.

FIG. 2: According to the state of the art, in a continuously variable drive unit under full load the start takes place from the stillstand at nominal speed of the internal combustion engine 2 (line L1). The speed of the internal combustion engine 2 remains constant over the entire speed range. The adjusting pump 13 is directly driven by the internal combustion engine 2 and rotates with a speed which is proportional to the nominal speed of the internal combustion engine 2. Line L2 shows the curve of the rotational speed of hydromotor 14 and line L3 the characteristic curve of the pressure in the hydrostat 15 over speed with its absolute maximum in the starting range.

Figure 3:
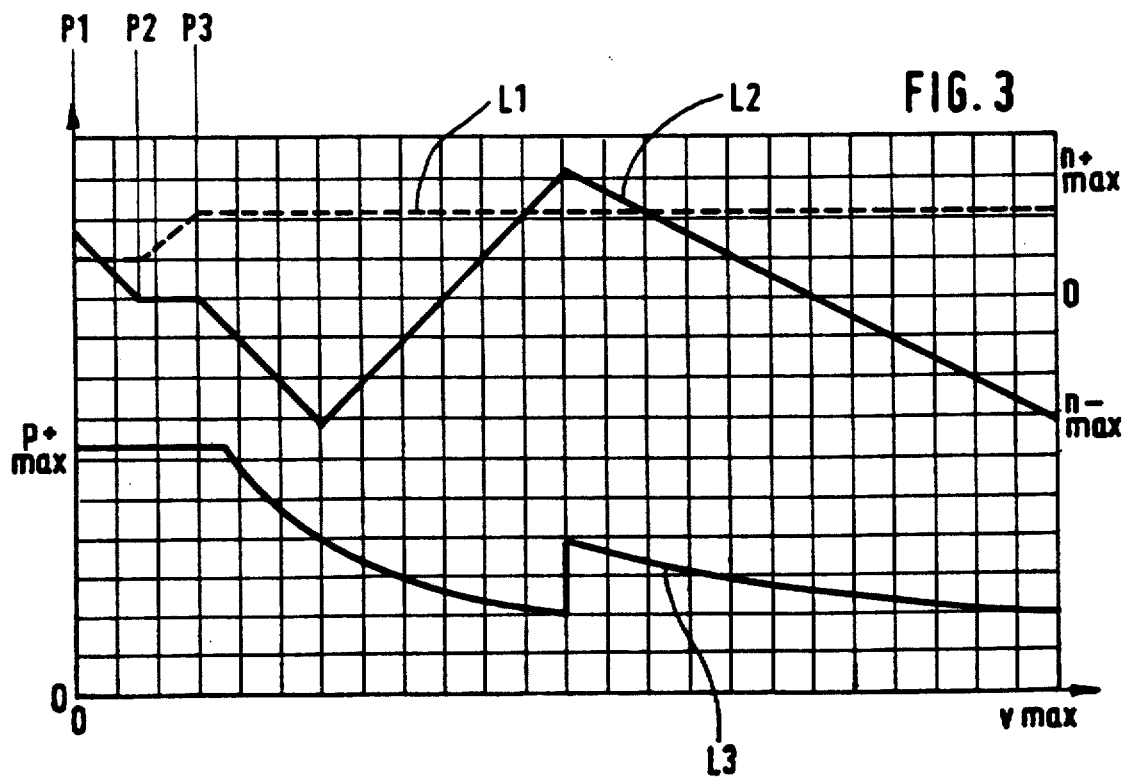
FIG. 3 shows in a diagram the rotational speed ratios and the pressure curve of a continuously variable drive unit, consisting of a controllable internal combustion engine and a hydrostatic-mechanical power split transmission as proposed by the invention.

FIG. 3: Point P1: In order to start the motor vehicle under full load, according to the invention the control device 3 at first reduces the nominal speed of the internal combustion engine 2, so that the internal combustion engine 2 runs with a lower speed (rpm) or at most with half the nominal speed. The adjusting pump 13 in the hydrostat 15 turns then also with half of the nominal rotational speed and drives the hydromotor 14 with increasing delivery volume. When the hydromotor 14 has reached in the hydrostat 15 a rotational speed , whose summation with a constant rpm in a linkage gear (not shown) results in a rpm equalling zero at the linkage shaft 21 or 22 pertaining to the first speed range, the control device 3 actuates the clutch 23 for the first shift range of the mechanical transmission branch 16. At this point, at the output shaft 8 of the power split transmission the rotational speed still equals zero.

P1-P2: The control device 3 acts upon the adjusting device 25 and reduces the delivery volume of adjusting pump 13. The rotational speed of the hydromotor 14 (line 2) decreases. The rotational speed of the shaft 20 of the mechanical transmission branch 16 remains proportional to the constant speed of the internal combustion engine 2. The summation of the decreasing and the constant rotational speed in the linkage gear results in a rotational speed difference, the transmission output shaft 8 starts rotating and the vehicle is set in motion.

Point P2: The adjusting pump 13 delivers only the amount which is necessary to keep the hydromotor 14 at a rotational speed equal to zero and to compensate leak losses.

P2-P3: The further increase in the vehicle speed takes place by increasing the rotational speed of the internal combustion engine 2 (line L1) up to the nominal rpm. The rotational speed of the adjusting pump 13 and of the mechanical branch 16 of the power split transmission 6 increases proportionally to the speed of the internal combustion engine 2. The delivery volume of the adjusting pump 13 remains constantly low (line L2). The rotational speed of the hydromotor 14 continues to be zero. The power flow through the hydrostat is low and the transmission runs at a favorable efficiency degree.

From point P3: The speed is further increased by further resetting the adjusting pump 13 to a larger delivery volume, so that the hydromotor 14 is again accelerated (line L2). The internal combustion engine remains constant at the nominal rotational speed (line L1). The preselected speed of the vehicle is reached by gear-shifting in the mechanical transmission branch 16 and changes in the delivery volume in the hydrostatic transmission branch 15 of the power split transmission 6.

Preferably, in order to start the vehicle under load, the rpm of the internal combustion engine 2 is adjusted at stillstand of the vehicle to half of the nominal engine speed and then continues to maintain this rpm , while the adjusting pump 13 reduces the delivery volume. At stillstand of the hydromotor 14 in the hydrostat 15, the further speed increase of the vehicle has then to take place through an increase in the rotational speed of the internal combustion engine 2 until it reaches the nominal rpm, and after that a new speed increase of the vehicle takes place again by readjusting the power split transmission 6, until the preselected speed is reached.

Within the framework of the invention it is also possible to conceive a different division of the part played by the change in the rotational speed of the internal combustion engine 2 in the increase of the vehicle speed at start under full load.

Reference Numerals

| | |
|---|---|
| 1 | selector switch |
| 2 | internal combustion engine |
| 3 | control device |
| 4 | line |
| 5 | line |
| 6 | power split transmission |
| 7 | shaft |
| 8 | transmission output shaft |
| 9 | line |
| 10 | line |
| 11 | line |
| 12 | line |
| 13 | adjusting pump |
| 14 | hydromotor |
| 15 | hydrostatic transmission branch |
| 16 | mechanical transmission branch |
| 17 | reduction gear |
| 18 | hollow shaft |
| 19 | reduction gear |
| 20 | shaft |
| 21 | linkage shaft |
| 22 | linkage shaft |
| 23 | clutch |
| 24 | rear axle |
| $n_{mot}$ | rotational speed of the internal combustion engine |
| line L1 | characteristic curve of the speed of the internal combustion engine over the vehicle speed |
| line L2 | rpm of the hydromotor over vehicle speed |
| line L3 | characteristic curve of the hydrostat pressure over vehicle speed |
| point P3 | starting point |
| P1-P2 | reduction of the delivery volume at constant rpm of the internal combustion engine |
| P2-P3 | rpm of the internal combustion engine at constant delivery volume |

We claim:

1. Method of operating a drive unit for motor vehicles, particularly for agricultural and construction machinery, consisting of an internal combustion engine with a controllable engine speed $n_{mot}$ and a continuously variable hydrostatic-mechanical power split transmission, whose multi-shaft linkage gear and whose regulating transmission having an adjusting pump are driven by the internal combustion engine, whereby a rotational speed of a hydromotor of the regulating transmission is superimposed on the linkage gear and whereby the linkage shafts of the linkage gear, which have synchronous rotational speeds at points close to the gear ranges of the regulating transmission, are alternately connectable with an output shaft over gear-shift clutches, characterized in that in a first phase of the starting operation under full load, the engine speed $n_{mot}$ is set at a value below the nominal rotational speed, the adjusting pump (13) is reset on maximum delivery volume and the clutch (23) is engaged for the first speed range of the power split transmission (6), that during a second phase (P114 P2) of the starting process the delivery volume of the adjusting pump (13) is lowered at a reduced engine speed $n_{mot}$, until the hydromotor (14) is stopped, that in a third phase of the starting process (P2-P3) the vehicle speed, with stopped hydromotor (14), is increased by raising the engine speed $n_{mot}$ to the nominal (rated) speed and that subsequently the speed increases until it reaches the preselected target speed, solely due to the change in the delivery volume of the adjusting pump (13), respectively the gear-range shift of the clutches (23).

2. Method of operating a drive unit for motor vehicles according to claim 1, characterized in that at the start of the vehicle under full load, the speed $n_{mot}$ of the internal combustion engine is first limited to at most one half of the nominal speed, under the assumption that it does not thereby fall below the idling speed.

3. Arrangement for operating a drive unit for motor vehicles, particularly for agricultural and construction machinery, consisting of an internal combustion engine with a controllable speed $n_{mot}$ and a continuously variable hydrostatic-mechanical power split transmission, whose multishaft linkage gear and whose regulating transmission which has an adjusting pump are driven by the internal combustion engine, whereby a rotational speed of a hydromotor of the regulating transmission is superimposed on the linkage gear and whereby the linkage shafts of the linkage gear, which have synchronous rotational speeds at points close to the gear ranges of the gear-range limits of the regulating transmission, are alternately connectable with an output shaft over gear-shift clutches, characterized in that a common control device (3) is provided for the internal combustion engine (2) and the power split transmission (6), which in a first phase of the starting operation under full load sets the engine speed $n_{mot}$ at a value below the nominal rotational speed, resets the adjusting pump (13) on maximum delivery volume and engages the clutch (23) for the first speed range of the power split transmission (6), that during a second phase (P1-P2) of the starting process the delivery volume of the adjusting pump (13) is lowered by the control device (3) at a reduced engine speed $n_{mot}$, until the hydromotor (14) is stopped, that in a third phase of the starting process (P2-P3) the vehicle speed, with stopped hydromotor (14) is increased by raising the engine speed $n_{mot}$ to the nominal (rated) speed and that subsequently the speed increases until it reaches the preselected target speed, solely due to the change in delivery volume of the adjusting pump (13), respectively the gear-range shift of the clutches (23).

4. Arrangement for operating a drive unit for motor vehicles according to claim 3, characterized in that at the start of the vehicle under full load, the control device (3) first limits the speed $n_{mot}$ of the internal combustion engine to maximum one half of the nominal speed, under the assumption that thereby it does not fall below the idling speed.

* * * * *